United States Patent Office 3,403,333
Patented Sept. 24, 1968

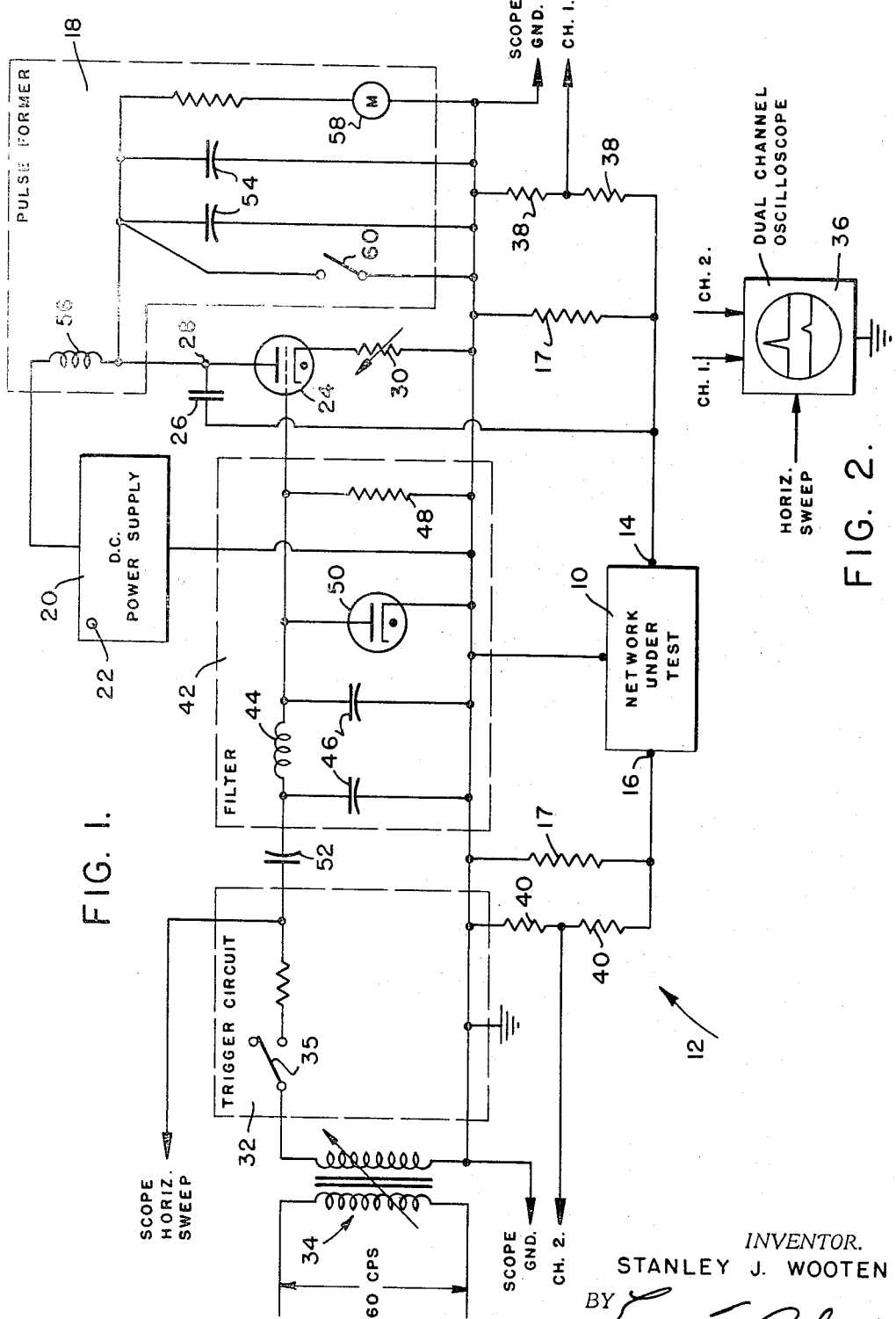

3,403,333
TRANSIENT PULSE SUPPRESSION TESTER INCLUDING MEANS FOR COMPARING GENERATED TRANSIENT VOLTAGES WITH OUTPUT VOLTAGES FROM THE NETWORK UNDER TEST
Stanley J. Wooten, Oxnard, Calif., assignor to the United States of America as represented by the Secretary of the Navy
Filed Sept. 29, 1966, Ser. No. 583,508
10 Claims. (Cl. 324—57)

The invention described herein may be manufactured and used by or for the Government of the United States of America for governmental purposes without the payment of any royalties thereon or therefor.

The present invention relates to a transient pulse suppression tester for testing a network such as a network which is to be employed in a power line for suppressing transient voltages.

Transient voltages in a power line can vary from 100 volts to over 10,000 volts and are often fatal to sensitive electronics equipment that may be on the power line. These unwanted transient voltages are caused by various conditions such as faulty lines or circuits, the switching of capacitive or inductive loads, unbalanced loading of three phase power transformers, and lightning discharges. Transient voltages have been especially damaging to solid state components which are designed within a close tolerance as to their operating voltages.

In order to protect the various electronics equipment on a power line a specially designed network is normally placed in the line to suppress transient pulses so that these pulses will not render the equipment inoperative. Because of the illusive nature of transient pulses and the impracticality of simulating such pulses in an operative power line, it has been very difficult in the past to design a suppression network for fulfilling a particular requirement. There has been a long existing need for a piece of equipment which will simulate power line transient voltages and test various networks for their capabilities in suppressing such transient voltages. Such a piece of equipment must be capable of generating very short duration and extremely fast time voltages which accurately simulate transient pulses occurring on a power line.

The present invention satisfies the aforementioned need by providing a transient pulse suppression tester which, upon being connected to a network to be tested, will generate transient voltages and compare these voltages with output voltages from the network to indicate the suppression capabilities of the network under test. Under the teachings of the present invention the transient pulse suppression tester may include a pulse forming circuit which is adapted to be coupled between a power source and the network under test; a trigger type gate means which is connected between the pulse forming circuit and the network under test for gating a pulse from the pulse forming circuit to the network; a trigger circuit which can be operated to trigger the gate means; a dual channel oscilloscope; the vertical sweep of one oscilloscope channel being connected to the input of the network and the vertical sweep of the other oscilloscope channel being connected to the output of the network so as to enable a comparison of the input and output signals; and means connected to the horizontal sweep of the oscilloscope for activating the horizontal sweep when the gate means is triggered. Other features of the invention will be apparent hereinafter.

An object of the present invention is to provide a circuit for testing the transient pulse suppression capabilities of a network;

Another object is to provide a circuit tester for generating a simulated power line transient pulse, applying the transient pulse to a network under test, and comparing the transient pulse with an output from the network so as to enable a determination of the pulse suppression capabilities of said network;

A further object is to provide a transient pulse suppression tester which includes a dual channel oscilloscope and means for synchronizing the oscilloscope with the remainder of circuitry; and Yet another object is to provide a simple yet efficient and accurate transient pulse suppression tester which can be easily operated to test the pulse suppression capabilities of a network.

Other objects, advantages and novel features of the invention will become apparent from the following detailed description of the invention when considered in conjunction with the accompanying drawing wherein:

FIG. 1 is an illustrative circuit diagram of the transient pulse suppression tester connected to a network under test; and FIG. 2 is a schematic illustration of a dual oscilloscope.

Referring now to the drawing there is shown a network 10 which is to be tested for its pulse suppression capability. Such a network may be intended for use in a power line for suppressing unwanted transient pulses. The transient pulse suppression tester 12 may be connected to the network under test by an input terminal 14 and an output terminal 16, the input terminal 14 being for the purpose of feeding a simulated transient pulse to the network 10 and the output terminal 16 being for the purpose of receiving the transient pulse after suppression by the network as will be described more fully hereinafter. The input and output terminals 14 and 16 are connected to respective input and output terminals of the network 10 and resistors 17 may be connected to the terminals to match the impedance of the network.

A pulse former 18 is adapted to be coupled between a high voltage D.C. power supply 20 and the input terminal 14 for the purpose of storing a transient pulse potential and feeding a formed pulse of short duration and high rise time to the network 10 through input terminal 14 when commanded to do so. The power supply 20 may be variable such as from zero to 10,000 volts so that a predetermined potential may be stored within the pulse former 18. The power supply 20 may be turned on and off by a switch 22.

Connected between the pulse former 18 and the network 10 is a trigger type gate means such as a thyratron tube 24 for gating a pulse from the pulse former 18 to the network. As stated hereinabove, the pulse former 18 is coupled to the input terminal 14. This may be accomplished by a capacitor 26 which is connected to the input terminal 14 and a point 28 which may be located between the pulse former 18 and the plate of the thyratron 24. Accordingly, when the thyratron 24 is triggered the thyratron will conduct a high rise, short duration pulse therethrough which is reflected across the capacitor 26 to the network 10. The rate of rise and width of pulse may be set by a variable resistor 30 which is connected between the thyratron cathode and ground.

The thyratron 24 may be triggered by a trigger circuit 32 which is coupled between an A.C. power source and the grid of the thyratron. The trigger circuit 32 may be coupled to the power source by a variable transformer 34. The variable tranformer 34 serves a unique function of synchronization which will be explained in detail hereinafter. The trigger circuit 32 includes an off-on switch 35 which is connected between the transformer 34 and the tube 24 and which upon closing will apply the A.C. trigger voltage to the tube 24. If the switch 35 is kept in the closed position the tube 24 will fire repeatedly.

In order to determine the suppression capability of the network 10 under test a comparison must be made between the input transient pulse to the network and the output therefrom. The tester 12 may employ a dual channel oscilloscope 36 for performing this function. The dual channel oscilloscope 36 may have a pair of vertical sweeps which may be considered as channel 1 and channel 2. These channels as well as a horizontal sweep circuit and ground connection of the oscilloscope 36 are connected to the circuitry described above in order to make the comparison of the pulses. As shown in the drawing, the input terminal 14 may be connected to channel 1 of the oscilloscope and the output terminal 16 may be connected to channel 2 thereof. In order to proportionately drop the pulse voltages applied to the oscilloscope channels, voltage dividers 38 and 40 may be employed. Each voltage divider may have one resistor connected between the channel and ground and another resistor connected between the channel and the appropriate terminal. In order to trigger the horizontal sweep of the oscilloscope 36 the horizontal sweep circuit may be connected to the trigger circuit 32 so that when the trigger circuit is operated a pulse therefrom will start the horizontal sweep of the oscilloscope. In this manner the oscilloscope 36 commences its horizontal sweep prior to receiving the channel pulses for comparison purposes.

The variable transformer 34 adjusts the amplitude of the AC trigger into the grid of the tube 24. By adjusting the transformer 34 the tube can be made to fire at various points on the positive side of the 60 c.p.s. waveform. Since the tube 24 is triggered by a particular voltage it can be made to fire earlier by increasing the amplitude of the AC trigger or can be made to fire later by decreasing the amplitude of the AC trigger. In this manner the vertical sweeps of channels 1 and 2 of the oscilloscope can be easily synchronized with the horizontal sweep thereof.

In order to protect the oscilloscope 36 and the trigger circuit 32 upon the firing of the thyratron 24, a filter 42 may be connected between the grid of the thyratron 24 and the trigger circuit 32. The filter 42 may include an inductor 44 which is connected in series with the thyratron grid, and a pair of capacitors 46 which are each connected between the grid and the thyratron plate so as to attenuate the feedback of the high voltage pulse appearing across the tube upon its firing. The filter 42 may further include a resistor 48 which is connected between the thyratron grid and its cathode for bleeding the charge from the capacitors 46 and thereby preventing a refiring of the thyratron tube 24. The filter 42 may further include a gas tube 50 which is connected between the thyratron grid and its cathode for the purpose of limiting the effective voltage on the grid as well as providing additional protection for the oscilloscope 36 and the trigger circuit 32. As shown in the drawing, the filter 42 may be coupled to the trigger circuit 32 by a capacitor 52.

While the pulse former 18 and the trigger circuit 32 may each comprise various combinations of elements, a preferable combination is shown for each circuit in the drawing. The pulse former 18 may include a pair of capacitors 54 which are connected between the plate and cathode of the thyratron tube 24 and an inductor 56 which is connected between the power supply 20 and the capacitors 54 and in series with the thyratron tube 24. Accordingly, the capacitors 54 will store a potential which will supply a current to the thyratron plate when the thyratron is in a conducting state. The size of the capacitors 54 will play a part in setting the duration of the simulated transient pulse and it has been found that a satisfactory size for each capacitor is in the order of 2 microfarads. A high voltage meter 58 may be connected across the capacitors 54 for indicating the charge thereon and a safety switch 60 may be connected across the capacitors 54 to ground for grounding the stored charge when deemed appropriate.

In the operation of the transient pulse suppression tester 12 variable resistor 30 is adjusted to set the rate of rise and width of the transient pulse, and the variable transformer 34 is adjusted to fire the thyratron tube 24, at a selected point on the positive 60 c.p.s. waveform, to allow synchronization with the oscilloscope 36 and the other circuit components. The switch 22 is operated to turn on the power supply 20 and the power supply is then adjusted for a desired voltage output. The safety switch 60 in the pulse former is then opened so that the capacitors 54 may be appropriately charged. Where it is desired to feed a simulated transient pulse to the network 10 the switch 35 is closed causing trigger pulses to be fed to the grid of the thyratron 24 as well as to the horizontal sweep of the oscilloscope 36. Accordingly, the trigger pulse commences the horizontal sweep of the scope and causes the thyratron tube 24 to conduct. Upon conduction of the thyratron tube 24 a transient pulse is fed to the network 10 via the capacitor 26. The output pulse from the network 10 is then compared with the simulated input pulse by their presentation on the oscilloscope 36. As shown in the presentation on the oscilloscope 36 (FIG. 2), the pulse to the left will represent the input transient pulse to the network 10 and the pulse to the right will represent the output pulse therefrom. The difference in height between these two pulses will indicate the suppression capability of the network 10. The oscilloscope in its presentation will also indicate the relative shapes of the two pulses. The filter 42 will protect the oscilloscope and the trigger circuit from the high voltage pulse conducted through the thyratron tube 24 and after such operation the resistor 48 will bleed the charge off the capacitors 46 to prevent any refiring of the thyratron tube 24 until such a time that another trigger pulse is received.

It is now readily apparent that the present invention provides an efficient and easily operable tester for testing the capability of a network to suppress a power line transient pulse. With such a tester suppression networks can be tested prior to placement in a power line and studies can be conducted to improve suppression networks now available.

Obviously many modifications and variations of the present invention are possible in the light of the above teachings. It is therefore to be understood that within the scope of the appended claims the invention may be practiced otherwise than as specifically described.

I claim:

1. A transient pulse suppression tester for testing the capability of a network to suppress transient voltages comprising:
    input and output terminals for connecting to respective input and output terminals of said network;
    a pulse forming circuit coupled to said input terminal and adapted to be connected to a power source for feeding a simulated transient pulse to said network through said input terminal;
    a triggered type gate means connected between the pulse forming circuit and said network for gating the pulse from the pulse forming circuit to said network;
    a trigger circuit coupled to the gate means and adapted to be connected to a power source for triggering said gate means;
    a dual channel oscilloscope;
    the vertical sweep of one oscilloscope channel being connected to said input terminal and the vertical sweep of the other oscilloscope channel being connected to said output terminal; and
    means connected to the horizontal sweep of the oscilloscope for activating the horizontal sweep when said gate means is triggered,
    whereby the input transient pulse and the output pulse from the network can be simultaneously presented on the oscilloscope to indicate the transient pulse suppression capability of said network.

2. A transient pulse suppression tester as claimed in claim 1 wherein:
    the gate means is a thyratron.

3. A transient pulse suppression tester as claimed in claim 2 wherein:

the pulse forming circuit is connected to the plate of the thyratron; and the pulse forming circuit being coupled to the input terminal by a capacitor which is connected between the plate of the thyratron and said input terminal.

4. A transient pulse suppression tester as claimed in claim 3 including:

a variable resistor connected between the cathode of the thyratron and ground for setting the rise time and width of pulse gated through the thyratron.

5. A transient pulse suppression tester as claimed in claim 1 wherein:

the means for activating the horizontal sweep when said gate means is triggered in the trigger circuit.

6. A transient pulse suppression tester as claimed in claim 5 wherein:

the trigger circuit is coupled to the gate means through a filter circuit for protecting the oscilloscope when a pulse is gated from the pulse forming circuit to said network.

7. A transient pulse suppression tester as claimed in claim 6 wherein:

the gate means is a thyratron; and the filter circuit includes a gas tube which is connected between the grid of the thyratron and the cathode thereof.

8. A transient pulse suppression tester as claimed in claim 7 wherein the filter circuit further includes:

at least one capacitor and a resistor connected in parallel with the gas tube and with one another and connected between the grid of the thyratron and the cathode thereof, the resistor bleeding any voltage from the thyratron grid if there is a static charge build-up of said capacitor.

9. A transient pulse suppression tester as claimed in claim 1 including:

a variable high voltage D.C. power supply; and said pulse forming circuit being connected to the D.C. power supply.

10. A transient pulse suppression tester as claimed in claim 1 wherein:

said trigger circuit is adapted to be connected to said power source by a variable transformer.

References Cited

UNITED STATES PATENTS 2,428,021  9/1947  Grieg _____ 324—121
2,649,570  8/1953  Radcliffe _____ 324—121 XR RUDOLPH V. ROLINEC, *Primary Examiner.*

E. E. KUBASIEWICZ, *Assistant Examiner.*